Dec. 5, 1944.   A. T. PARRY   2,364,240
OIL FILTER
Filed May 25, 1943    2 Sheets-Sheet 1

Inventor
Albert Thomas Parry
By Clarence A. O'Brien
and Harvey B. Jacobson
Attorneys Dec. 5, 1944.      A. T. PARRY      2,364,240
OIL FILTER
Filed May 25, 1943      2 Sheets-Sheet 2
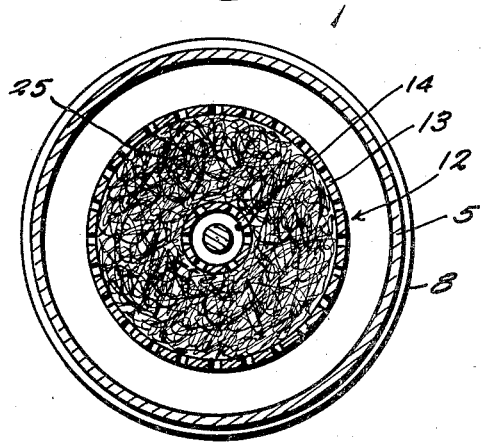
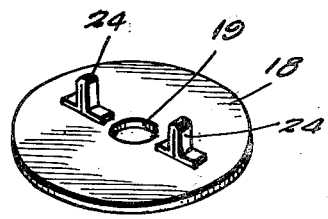
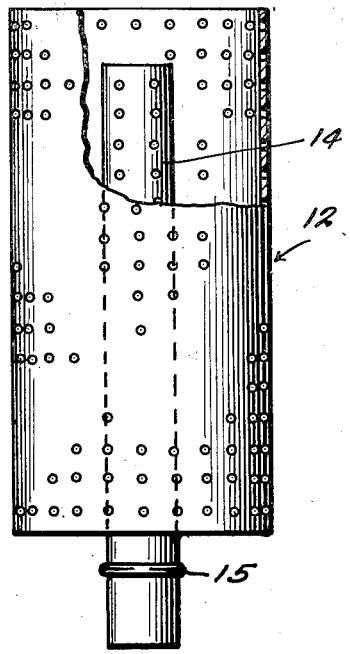
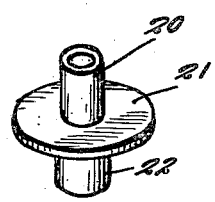
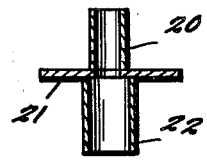
Inventor
Albert Thomas Parry Patented Dec. 5, 1944

2,364,240

UNITED STATES PATENT OFFICE 2,364,240

OIL FILTER

Albert Thomas Parry, Norway, Kans.

Application May 25, 1943, Serial No. 488,411

1 Claim. (Cl. 210—131)

This invention relates to new and useful improvements in oil filters such as are used on automobiles, with the principal object of the invention being to provide an oil filter employing a removable filtering cartridge which can be easily removed and replaced with but a minimum of effort.

Another important object of the invention is to provide a filter of the character described wherein the parts are readily accessible at all times for the purpose of repairs or replacements.

Another important object of the invention is to provide a filter of the character stated which can be manufactured at less cost than most types of filters now in general use.

Other objects and advantages of the invention will become apparent to the reader of the following description.

In the drawings:

Figure 3 is a cross-sectional view.

Figure 4 is a side elevational view of the perforated cartridge.

Figure 5 is a perspective view of the follower.

Figure 6 is a perspective view of the follower guide.

Figure 7 is a sectional view through the follower guide.

Figure 1:
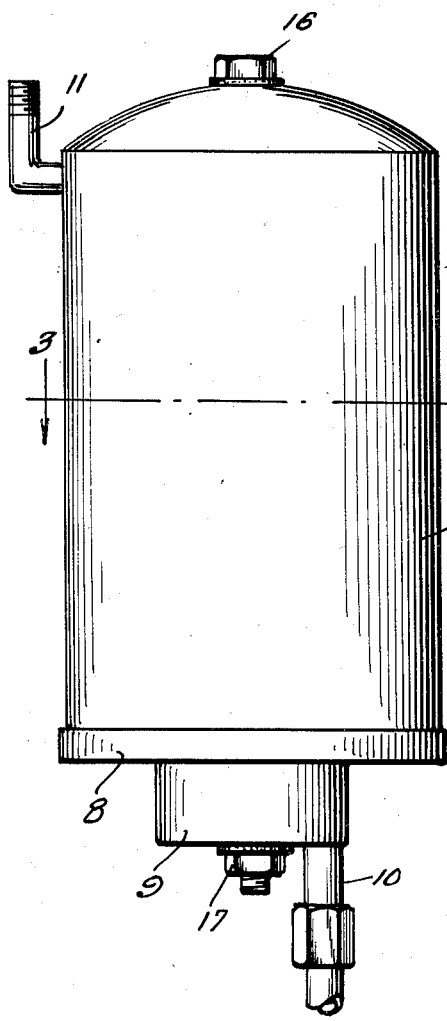
Figure 1 is a side elevational view of the filter.
Figure 2:
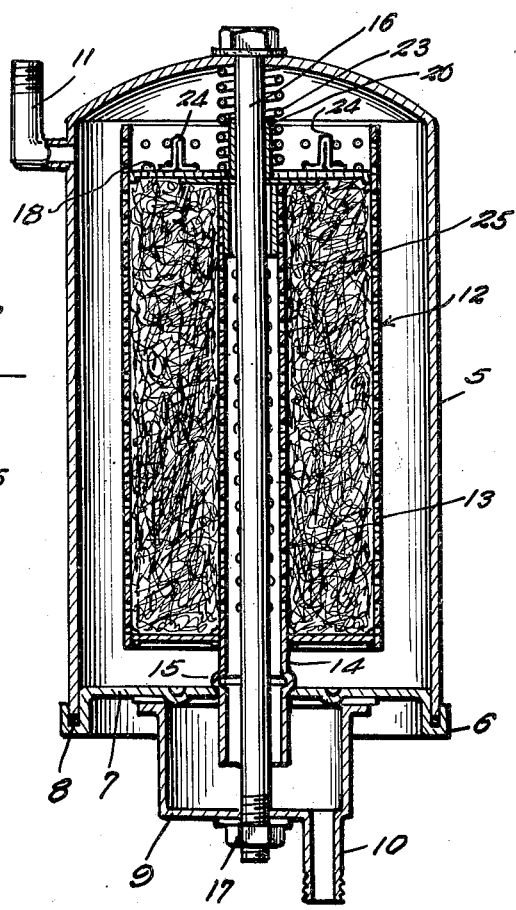
Figure 2 is a vertical sectional view through the filter.

Referring to the drawings wherein like numerals designate like parts, it can be seen that numeral 5 denotes a cylindrical shell, the lower edge portion of which is adapted to be disposed into trough-like formation 6 at the edge portion of a bottom 7 which has considerable packing means 8 therein. Numeral 9 denotes a well depending from the bottom 7 and this has a nipple 10 depending therefrom to which a conduit can be connected.

At the upper portion of the shell 5 is an inlet nipple 11.

Numeral 12 generally refers to a cartridge which consists of a perforated container 13 having an opening in the bottom thereof through which an elongated perforated tube 14 is disposed and suitably secured as by welding. The upper end of the tube 14 terminates slightly below the top of the container 13. The lower portion of the tube 14 has a circumferential rib 15 which can bear upon the bottom 7 when the lower extremity of the tube is disposed through an opening in the bottom 7.

The top of the shell 5 has an opening therein and through this is disposed an elongated tie rod 16 which extends downwardly through the tube 14 and through the well 9 and is equipped with a nut 17 at its lower end which can be tightened against the bottom of the well 9 to hold the parts firmly together.

Numeral 18 denotes a follower plate which is disposed within the upper portion of the container 13 and has a central opening 19 through which the rod 16 is disposed. Also disposed through the opening 19 is a short tube 20 projecting from a washer 21. A short skirt 22 depends from the washer 21 and acts as a guide, snugly fitting within the upper portion of the tube 14.

A coiled compression spring 23 is located on the upper portion of the rod 16, same being interposed between the top side of the follower plate 18 and the under side of the top of the shell 5.

Lifting lugs 24, 24 are provided on the top side of the follower plate 18.

Obviously, when the nut 17 is tight, the parts are firmly held together, and the spring 23 is urging the follower plate 18 downwardly against a mass 25 of waste material, or other matter usually employed for filtration, thus keeping the mass compact.

Obviously, when it is desired to refill the filter all that is necessary is to remove the shell 5 from the bottom 7, thus releasing the container 13, so that the material 25 can be removed from the container and fresh material inserted, after which the device can be put back together for use.

While the foregoing specification sets forth the invention in specific terms, it is to be understood that numerous changes in the shape, size, and materials may be resorted to without departing from the spirit and scope of the invention as claimed hereinafter.

Having described the invention what is claimed as new is:

A filter comprising an imperforate bottom having a trough-like edge portion and provided with a central opening, an imperforate shell open at the bottom and having a top wall, the lower end of the shell fitting in the trough-like edge portion of the bottom, said shell having an inlet near the top, a perforated tube disposed centrally of the shell and mounted on the bottom with its lower end depending through the central opening of said bottom, a well carried by and depending from the bottom and into which the lower end of the tube opens, said well having a bottom outlet, a cylindrical filtering element mounted on the perforated tube within and in spaced concentric relation to the shell, and a bolt extending through the top of the shell, the tube and the bottom of the well and having a nut threaded thereon for securing the shell and bottom together, said filtering element including an open top perforated container extending above the tube and having a quantity of waste therein, a washer resting on the upper end of the tube and having a depending skirt fitted in the upper portion of said tube, a tubular guide rising from the washer and surrounding the bolt, a follower slidable on said guide and in the upper end of the container, lifting lugs on the follower, and a spring surrounding the bolt and interposed between the top of the shell and the follower to press the latter downwardly against the top of the waste.

ALBERT THOMAS PARRY.